(12) United States Patent
Shukla et al.

(10) Patent No.: US 10,262,016 B2
(45) Date of Patent: Apr. 16, 2019

(54) TUNING KEY SPACE AT THE TIME OF INSTANTIATION OF A TREE DATA STRUCTURE

(71) Applicant: VMware, Inc., Palo Alto, CA (US)

(72) Inventors: Ritesh Shukla, Saratoga, CA (US); Serge Pashenkov, Los Altos, CA (US); Li Ding, Cupertino, CA (US); Bret Needle, Foster City, CA (US); Mayank Rawat, Sunnyvale, CA (US)

(73) Assignee: VMWARE, INC., Palo Alto, CA (US)

( * ) Notice: Subject to any disclaimer, the term of this patent is extended or adjusted under 35 U.S.C. 154(b) by 635 days.

(21) Appl. No.: 14/869,099

(22) Filed: Sep. 29, 2015

(65) Prior Publication Data

US 2017/0091242 A1    Mar. 30, 2017

(51) Int. Cl.
    *G06F 17/30*    (2006.01)
(52) U.S. Cl.
    CPC .............................. *G06F 17/30327* (2013.01)
(58) Field of Classification Search
    CPC .................................................. G06F 17/30327
    See application file for complete search history.

(56) References Cited

U.S. PATENT DOCUMENTS

| | | | |
|---|---|---|---|
| 6,138,123 A | 10/2000 | Rathbun | |
| 6,427,147 B1 | 7/2002 | Marquis | |
| 9,529,398 B2 | 12/2016 | Graefe | |
| 9,529,836 B1 | 12/2016 | Hale | |
| 2003/0130981 A1 | 7/2003 | Nehru | |
| 2006/0004792 A1 | 1/2006 | Lyle | |
| 2008/0086470 A1 | 4/2008 | Graefe | |
| 2010/0042596 A1 | 2/2010 | Shinjo et al. | |
| 2010/0281013 A1 | 11/2010 | Graefe | |
| 2010/0306410 A1 | 12/2010 | Jansen et al. | |
| 2011/0252067 A1* | 10/2011 | Marathe | G06F 17/30958 707/797 |
| 2013/0297613 A1 | 11/2013 | Yu | |
| 2013/0318126 A1 | 11/2013 | Graefe | |
| 2017/0032005 A1* | 2/2017 | Zheng | G06F 17/30088 |

OTHER PUBLICATIONS

Rudolf Bayer and Karl Unterauer, "Prefix B-Trees", ACM Transactions on Database Systems, vol. 2, No. 1, Mar. 1977, pp. 11-26.*
Serge Pashenkov et al, Related U.S. Appl. No. 14/869,024 on Sep. 29, 2015, entitled "Leveraging Hierarchy in a Tree Data Structure to Dynamically Allocate Keys".
Office Action dated Nov. 28, 2017; U.S. Appl. No. 14/869,024; (33 pgs.).

* cited by examiner

*Primary Examiner* — Cheryl Lewis (57) ABSTRACT

Techniques for tuning the key space of an instance of a tree data structure are provided. In one embodiment, a computer system can receive a request to create the instance, where the request includes an expected key space value indicating an expected range of key values to be addressed by the instance. The computer system can further calculate a number of bits to allocate to each key of each node of the instance based on the expected key space value. The computer system can then, at a time of instantiating each node of the instance, allocate the keys for the node in accordance with the calculated number of bits.

18 Claims, 7 Drawing Sheets

TUNING KEY SPACE AT THE TIME OF INSTANTIATION OF A TREE DATA STRUCTURE

BACKGROUND

In computing, a B+ tree is a tree-based data structure that allows for the efficient searching and retrieval of key-value data (i.e., data organized in the form of key-value pairs [K, V]). For the purposes of the present disclosure, the content of a key K is referred to as the "key value" of K (or the "value of the key"). This should not be confused with value V in key-value pair [K, V], which is referred to herein as the "data entry" associated with key K.

Generally speaking, a B+ tree comprises two types of nodes: internal nodes and leaf nodes. Internal nodes appear between the root and bottom levels of a B+ tree and are considered navigational nodes because they guide tree traversal. In particular, each internal node stores up to b−1 keys and up to b pointers to lower level (i.e., child) nodes, where b is the branching factor of the tree. Each pointer is "between" two of the internal node's keys, if it references the root of a subtree where all keys in the subtree have a key value within the key subinterval defined by the two keys in the internal node. Stated more formally, for each internal node N having m keys, all keys in the subtree rooted by the first child of N have a key value less than N's first key, and all keys in the subtree rooted by the i-th child of N (where $2<=i<=m$) have a key value greater than or equal to the (i−1)th key of N and less than the i-th key of N.

In contrast to internal nodes, leaf nodes appear only at the bottom level of a B+ tree and are considered storage nodes because they store the actual key-value data within the tree (up to b−1 keys/data entries per leaf node). To facilitate sequential access to these data entries, the leaf nodes can be configured to point to each other in the form of a linked list.

The root node of a B+ tree is a special case and can act as either an internal node or as a leaf node. The root node will be a leaf node in scenarios where the B+ tree does not contain sufficient data entries to overflow a single node. Moreover, B+ trees are "balanced" in the sense that all leaf nodes are the same distance from the root node, and each non-root node is guaranteed to be at least half full with pointers or data entries. These properties are enforced by the way in which nodes are split and merged when key-value pairs are inserted into, and deleted from, the B+ tree respectively.

One issue with conventional B+ tree implementations is that, at the time of creating/instantiating a tree data structure, they generally allocate a fixed amount of memory space for each key in the tree instance based on the largest possible "key space" (i.e., range of key values) supported by an associated application. By way of example, consider an application that uses B+ trees for tracking writes to virtual disk snapshots. In this example, the keys in each B+ tree correspond to addresses in a virtual disk, and the data entries in each B+ tree correspond to addresses of logical disks/volumes on physical media where data for a given virtual disk address has been written. If the maximum possible size of a virtual disk snapshot is 256 terabytes (TB), then a conventional B+ tree implementation may allocate, for each node of a B+ tree created via this application, a fixed amount of 64 bits per key (since 64 bits is sufficient to address a 256 TB key space).

The problem with this approach is that, in many cases, the actual size of a given virtual disk snapshot will fall far below the theoretical maximum of 256 TB. For instance, assume that a virtual disk snapshot is created that is 128 gigabytes (GB) in size (which is likely to be closer to the average than 256 TB). In this case, each key in the B+ tree created for this virtual disk snapshot will still be allocated 64 bits, even though a considerably fewer number of bits are required to represent the key space of 128 GB. This, in turn, will result in wasted memory space on-disk and/or in RAM or cache. The degree of this wasted memory overhead can become significant if a large number of trees are created and maintained concurrently, or if higher and higher theoretical limits on key space (e.g., on the order of petabytes, exabytes, etc.) are implemented by the application over time.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

The present disclosure describes techniques for intelligently managing the allocation of keys in an instance of a tree data structure (e.g., a B+ tree) in order to reduce the memory footprint of the tree instance. As used herein, the phrase "allocating a key" refers to the act of allocating an amount of memory, such as Xbits, for encoding the contents (i.e., key value) of the key. This amount of allocated memory is referred to as the key's size.

According to a first set of embodiments, a computer system can receive, from an application configured to make use of a tree data structure, a request to create/instantiate an instance of the tree data structure, where the request includes an indication of a key space that is expected to be addressed for this particular tree instance. For example, assume that the application is configured to manage virtual disk snapshots that make use of B+ trees to map virtual disk addresses to logical storage addresses. Further assume that the application determines the size of a particular virtual disk snapshot S1 will not exceed 10 GB, even though the maximum possible size is higher, such as 256 TB. In this scenario, the application can include, as part of a request to instantiate a B+ tree for S1, an expected key space of 10 GB (in order to cover the range of virtual disk addresses from 0 to 10 GB).

Upon instantiating the nodes in the tree instance, the computer system can allocate keys for the nodes based on the expected key space, rather than the maximum possible key space supported by the application. For example, upon instantiating the root node, the computer system can allocate an appropriate number of bits (e.g., X) for each key in the root node that is sufficient to cover the range of 0 to the expected key space value. Similarly, upon instantiating any subsequent non-root node, the computer system can allocate the same number of bits X for each key in that non-root node. In this way, the computer system can adapt, or "tune," the key space for the entire tree instance in accordance with what is expected/needed by the requesting application.

According to a second set of embodiments, the computer system can leverage the hierarchical organization of a tree data structure such as a B+ tree to dynamically allocate different sized keys on a per-node basis for a given tree instance. At a high level, this second set of embodiments is based on the observation that, in a B+ tree (and other similar types of trees), the size of the key space addressed by a non-root node will be a subset (i.e., subinterval) of the key space addressed by that node's parent node. For example, if a non-root node N1 is pointed to by a parent node N2 and the pointer to N1 lies between the (i−1)th and i-th keys of N2, then the key range addressed by N1 will correspond to a subinterval having key values that are greater than or equal to the (i−1)th key in N2 and less than the i-th key in N2.

In these embodiments, the computer system can, at the time of instantiating each non-root node in an instance of the tree, dynamically determine the minimum key space that needs to be addressed by that specific node in view of the node's parent. For instance, if the total key space addressed by the parent is 32 bits but the key subinterval associated with the parent pointer referencing the node spans 8 bits, the computer system can determine that the node only needs to address an 8 bit key space. The computer system can then allocate memory for each key in the node based on this dynamically determined key space. With this approach, fewer and fewer bits will be needed to store node keys as the computer system traverses downward in the tree hierarchy. It should be noted that this second set of embodiments can be used separately from, or in combination with, the first set of embodiments. For example, the first set of embodiments can be applied to configure a key size for the root node of a tree instance based on an expected key space determined by an application. The second set of embodiments can then be applied to non-root nodes in the same tree instance in order to further reduce key size on a dynamic, per-node basis.

With the various techniques mentioned above, the amount of memory consumed by a tree instance can be significantly reduced, thereby making more efficient use of the storage medium (e.g., disk or RAM) on which the tree instance resides. Further, this reduction in memory consumption can effectively allow for a greater number of keys to fit within each node (which is typically aligned in size with disk blocks or cache lines). This can advantageously reduce the number of I/O operations needed to traverse the tree (if the tree is on-disk), or increase cache hit ratio for a given amount of cache memory (if certain nodes of the tree are cached).

The foregoing and other aspects of the present disclosure are described in further detail in the sections that follow. It should be appreciated that, although certain embodiments and examples are described in the context of B+ trees, the techniques of the present disclosure are not solely limited to use with B+ trees. Rather, these techniques may be applicable to other similar types of tree data structures that facilitate the storing and searching of key-value data.

2. System Environment

Figure 1:
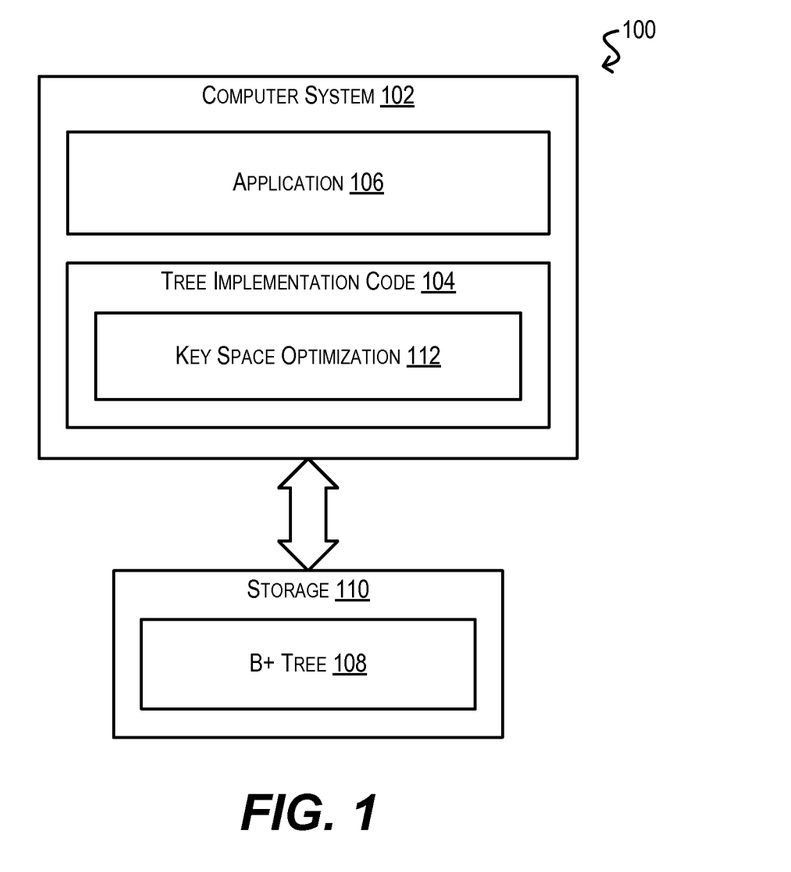
FIG. 1 depicts a system environment according to an embodiment.

FIG. 1 depicts a system environment 100 that supports embodiments of the present disclosure. As shown, system environment 100 includes a computer system 102 that is configured to execute tree implementation code 104 and an application 106. Computer system 102 is communicatively coupled with a storage component 110, which may be a locally-attached or remote nonvolatile storage device such as a hard disk drive/array, a flash storage device, etc. Tree implementation code 104 can comprise code and application programming interfaces (APIs) for implementing a tree data structure, such as a B+ tree. For example, tree implementation code 104 can include code/APIs for creating an instance of the tree data structure (like B+ tree 108 shown in storage 110), inserting elements into the tree instance, deleting elements from the tree instance, searching the tree instance, and so on.

Application 106 can by any type of software program that is configured to make use of tree data structures by interacting with tree implementation code 104. For example, in a particular embodiment, application 106 can be a program for managing virtual disk snapshots, where each virtual disk snapshot is associated with a B+ tree that keeps track of I/O writes to the snapshot (via mappings between virtual disk addresses and logical storage addresses). In other embodiments, application 106 can be, e.g., a database application, a file system, a networking application, etc.

As noted in the Background section, one shortcoming with conventional B+ tree implementations is that they generally allocate memory space for keys within each B+ tree instance based on a fixed key space that corresponds to the maximum possible (i.e., worst case) key space supported by an associated application, like application 106. This is done regardless of whether a given tree instance will actually address that maximum key space in view of the keys/data entries that will be inserted. As a result, a large proportion of the memory allocated for such keys may go effectively unused (e.g., 64 bit keys may be populated with much smaller key values), leading to poor usage of available memory and reduced performance when performing tree operations (due to a lower key-to-node ratio).

To address these and other similar issues, tree implementation code 104 can include a novel key space optimization component 112. As detailed in Section 3 below, in one set of embodiments key space optimization component 112 can implement a key space tuning technique that takes into account an expected key space value (received from, e.g., application 106) at the time of instantiating a tree instance. The expected key space value can reflect the total key space that application 106 expects to be needed for this particular tree instance. Key space optimization component 112 can then allocate keys in the tree instance that are sized in accordance with the expected key space (rather than the maximum possible key space supported by application 106). Thus, this technique allows tree implementation code 104 to create tree instances capable of addressing any arbitrarily sized key space, without incurring the wasted memory overhead of large keys in cases where the actual key size needed is small.

Further, as detailed in Section 4 below, in a second set of embodiments key space optimization component 112 can implement a per-node, dynamic key allocation technique that leverages the inherent hierarchy in tree data structures such as B+ trees. With this technique, key space optimization component 112 can dynamically allocate keys for each non-root node in a tree instance based on the minimum key space that needs to be addressed by that specific non-root node in view the corresponding key subinterval in the node's parent. For instance, if the key subinterval corresponding to the non-root node in the parent is 8 bits (out of, e.g., a total of 32 bits covered by the parent), key space optimization component 112 can allocate keys in the non-root node that address a key space of exactly 8 bits, rather than 32 bits. In this way, key space optimization component 112 can take advantage of the inherent key space reduction that occurs at each tree level (moving downward from the root) in order to reduce the overall memory footprint of the tree instance.

System environment 100 of FIG. 1 is illustrative and not intended to limit embodiments of the present disclosure. For example, although tree implementation code 104 and application 106 are shown as separate entities in computer system 102, in some embodiments the functionality of tree implementation code 104 may be integrated into application 106. As another example, although tree implementation code 104 and application 106 are shown as running on a single machine, in some embodiments these components may run on different machines and communicate with each other via an appropriate network link. As yet another example, in some embodiments the various components depicted in FIG. 1 may comprise subcomponents or perform functions that are not explicitly described. One of ordinary skill in the art will recognize many variations, modifications, and alternatives.

3. Tuning Key Space Upon Tree Instantiation

Figure 2:
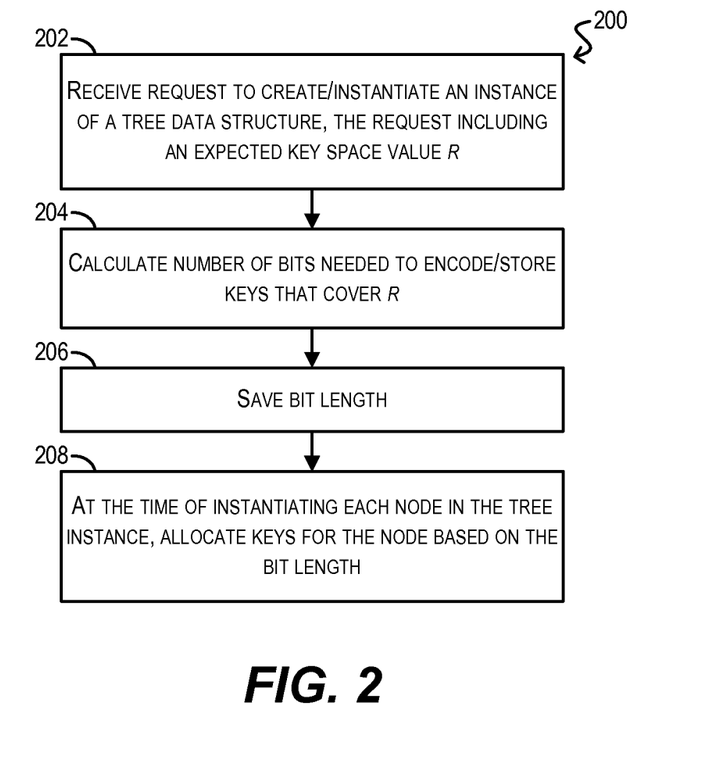
FIG. 2 depicts a workflow for tuning the key space of a tree instance upon instantiation according to an embodiment.

FIG. 2 depicts a workflow 200 that can be performed by key space optimization component 112 of FIG. 1 for tuning the key space of a newly instantiated tree instance based on an expected key space value received from an associated application (e.g., application 106) according to an embodiment.

Starting with block 202, key space optimization component 112 can receive a request to create/instantiate an instance of a tree data structure (e.g., a B+ tree), where the request includes a value r indicating an expected key space (i.e., range) that will be addressed by the tree instance. In one embodiment, the request and the expected key space value r can be received from application 106, in which case r can represent the key space expected to be needed by that application in view of the application's desired use of the tree. For example, if application 106 is a program for managing virtual disk snapshots as mentioned previously, application 106 may determine that the snapshot corresponding to the tree instance will not exceed 10 GB in size, and thus the expected key space is 10 GB. In other embodiments, the request and/or the expected key space value can be received from another source, such as from a user.

At block 204, key space optimization component 112 can calculate the number of bits needed to encode/store keys that cover the expected key space value r received at block 202. Generally speaking, key space optimization component can perform this calculation by taking the logarithm in base 2 of r. For instance, if r is 65536, the number of bits needed to encode/store the range of 0 to 65536 (at integer granularity) would be $\log_2(65536)=16$ bits. In cases where key space optimization component 112 wishes to calculate the amount of needed memory using a number system other than the binary system, component 112 can take the logarithm in base x of r, where x is the radix of the system (e.g., 10 for the decimal system). Further, in cases where the logarithm calculation does not yield a whole integer result, component 112 can compute the ceiling of the logarithm to determine the appropriate memory amount.

At block 206, key space optimization component 112 can save the bit length determined at block 204. Finally, at the time of instantiating each node in the tree instance (e.g., upon instantiating the root node, performing a node split, or a node merge), key space optimization component 112 can allocate keys for the node using the saved bit length (block 208). For example, if the saved bit length is 16 bits, key space optimization component 112 can allocate keys that are each 16 bits in size.

Other than modifying how key allocations are performed at the time of node instantiation, workflow 200 does not affect the algorithms used by tree implementation code 104 for carrying out tree operations such as search, insert, or delete. Thus, the code impact of this key space tuning technique is relatively small. At the same time, this technique can lead to significant savings in the size of the tree instance if the expected key space value r configured by application 106 is substantially less than the maximum possible key space supported by the application.

Figure 3:
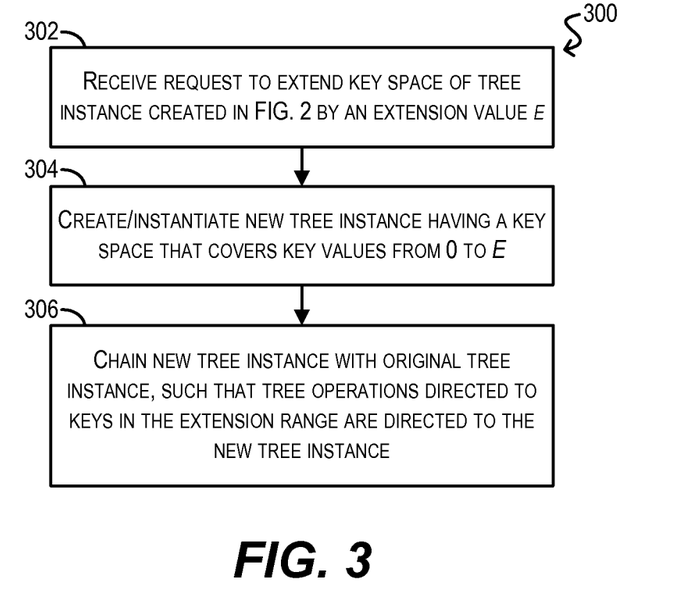
FIG. 3 depicts a workflow for extending the key space of the tree instance described in FIG. 2 according to an embodiment.

In some cases, application 106 may wish to extend the key space of a tree instance after it has been created and populated with nodes in accordance with workflow 200 of FIG. 2. For instance, at the time of tree creation, application 106 may have assumed that the tree would only need a key space of r, but may later determine that additional data entries need to be inserted that map to a key space of r+e. In these scenarios, key space optimization component 112 can carry out a range extension workflow 300 as shown in FIG. 3.

At block 302 of workflow 300, key space optimization component 112 can receive a request from application 106 to extend the key space of the tree instance created in workflow 200 (i.e., value r) by an extension value e. Alternatively, key space component 112 can receive a new total key space value from application 106, in which case component 112 can determine e by subtracting the previous expected key space value r from the new total key space value.

Upon receiving/determining the extension value e, key space optimization component 112 can create/instantiate an entirely new tree instance, where the key space of the new tree instance covers the range of key values from 0 to e (block 304). For example, if the extension value is 5 GB, the key space of the new tree instance will cover the range of 0 to 5 GB. In a particular embodiment, this means that each key in the new tree instance will be allocated a key size of $\log 2(e)$ bits.

Then, at block 306, key space optimization component 112 can "chain" the new tree instance with the original tree instance, which means that the two trees are associated in a manner that causes any tree operations for keys in the extension range to be directed to the new tree instance, and any tree operations for keys in the original range to be directed to the original tree instance. For instance, if a new key-value pair [K, V] needs to be inserted where r<K<=e, the key-value pair can be inserted into the new tree instance rather than the original tree instance. As part of this insertion process, key K can be modified to conform to the extension range addressed in the new tree instance by, e.g., subtracting r from K. In one embodiment, the chaining of the new tree instance with the original tree instance can be implemented by including metadata in the root node of the original tree instance that identifies the extension range covered by the new tree instance and a pointer to the new tree instance.

In addition to extending the key space for a tree instance, in some cases application 106 may also wish to reduce the tree's key space. If this reduction in key space corresponds to the removal of a range extension that was previously implemented via workflow 300, the new tree instance created at block 304 of workflow 300 can simply be deleted in its entirety. Otherwise, specific subtrees in the new or original tree instance that correspond to the removed key space can be deleted. In this latter case, the remaining keys in the tree instance can be left alone, or can be re-encoded using the number of bits needed to address the reduced key space. For example, if the new tree instance covers an extension range of 32 bits and this extension range is later reduced to 16 bits, key space optimization component 112 can remove all of the subtrees and keys in the new tree instance that address the key space between 16 and 32 bits. Further, component 112 can leave the remaining keys in the new tree instance as 32 bit keys, or re-allocate each key to consume 16 bits (rather than 32 bits) of memory and re-encode the key value for each key as a 16 bit value.

4. Leveraging Tree Hierarchy for Performing Dynamic, Per-Node Key Allocation

In addition to (or in lieu of) the configurable key space tuning described in Section 3, key space optimization component 112 can also implement techniques for dynamically allocating/sizing keys on a per-node basis in order to reduce the memory footprint of a tree. These dynamic techniques take advantage of the fact that, in B+ trees (and other similar types of trees), the range of keys addressed by any non-root node will be a subset of the range of keys addressed by the node's parent. This means that the keys in the non-root node can be represented using a smaller number of bits than the parent's keys by, e.g., eliminating one or more of the least significant bits (LSB) and/or most significant bits (MSB) from the parent key range.

Figure 4:
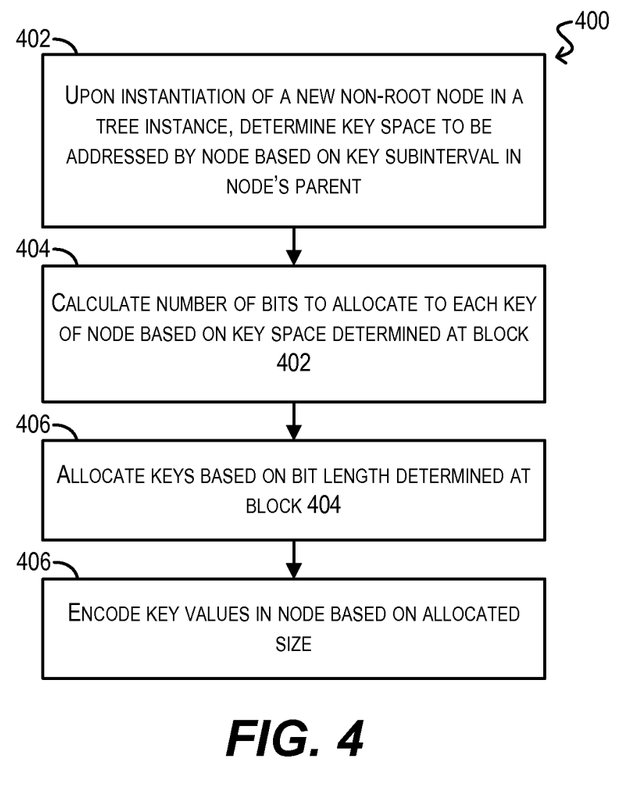
FIG. 4 depicts a workflow for dynamically allocating keys for a tree instance on a per-node basis according to an embodiment.

FIG. 4 depicts a workflow 400 for implementing this dynamic, per-node key allocation at the time of instantiating a new non-root node in a tree instance (e.g., a B+ tree) according to an embodiment. The instantiation of a new non-root node may occur in the context of a "node split" operation that is triggered by the insertion of a new data entry into the tree. Such a node split will result in the creation of two new nodes that are split from an original node, each of which may be processed in accordance with workflow 400.

Alternatively, the instantiation of a new non-root node may occur in the context of a "node merge" operation that is triggered by the deletion of a data entry from the tree. Such a node merge will result in the creation of a new merged node that contains the aggregated data entries or pointers from two original nodes. This new merged node may also be processed in accordance with workflow 400.

Starting with block 402, upon the instantiation of a new non-root node (e.g., a split node or a merged node), key space optimization component 112 can determine the key space that will be addressed by the node based on the key subinterval in the node's parent that points (or will point) to this node. In case of a node split, the key subinterval will generally correspond to the range of key values needed to cover the keys split off from the original node and included in the current node. In the case of a node merge, the key subinterval will generally correspond to the range of key values needed to cover all of the keys in the two original, non-merged nodes. Note that this key subinterval will be strictly less than the total key space addressed by the node's parent.

At block 404, key space optimization component 112 can calculate the number of bits to be allocated to each key in the node based on the key space determined at block 402. As part of this step, key space optimization component 112 can determine the number of unique, addressable key values in the key space, and can compute the logarithm in base 2 of that number. For example, if the key subinterval in the parent is 1024 to 2047, the number of unique, addressable key values in this key space (assuming integer granularity) is 2047−1024+1=1024, and thus the number of bits needed to address this number of keys would be $\log_2(1024)=10$ bits.

Finally, at blocks 406 and 408, key space optimization component 112 can allocate keys within the node based on the bit length determined at block 404 and can encode the key values of the node based on the allocated size.

Figure 5A:
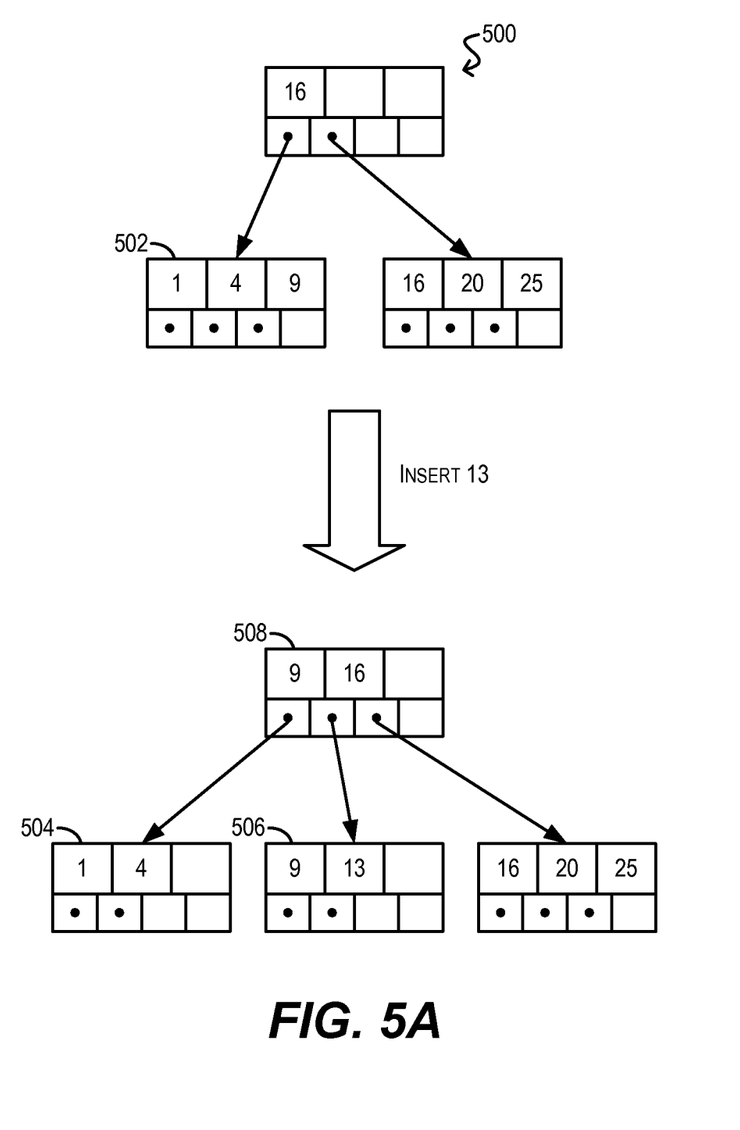
FIGS. 5A and 5B depict split and merge operations performed on an exemplary B+ tree.
Figure 5B:
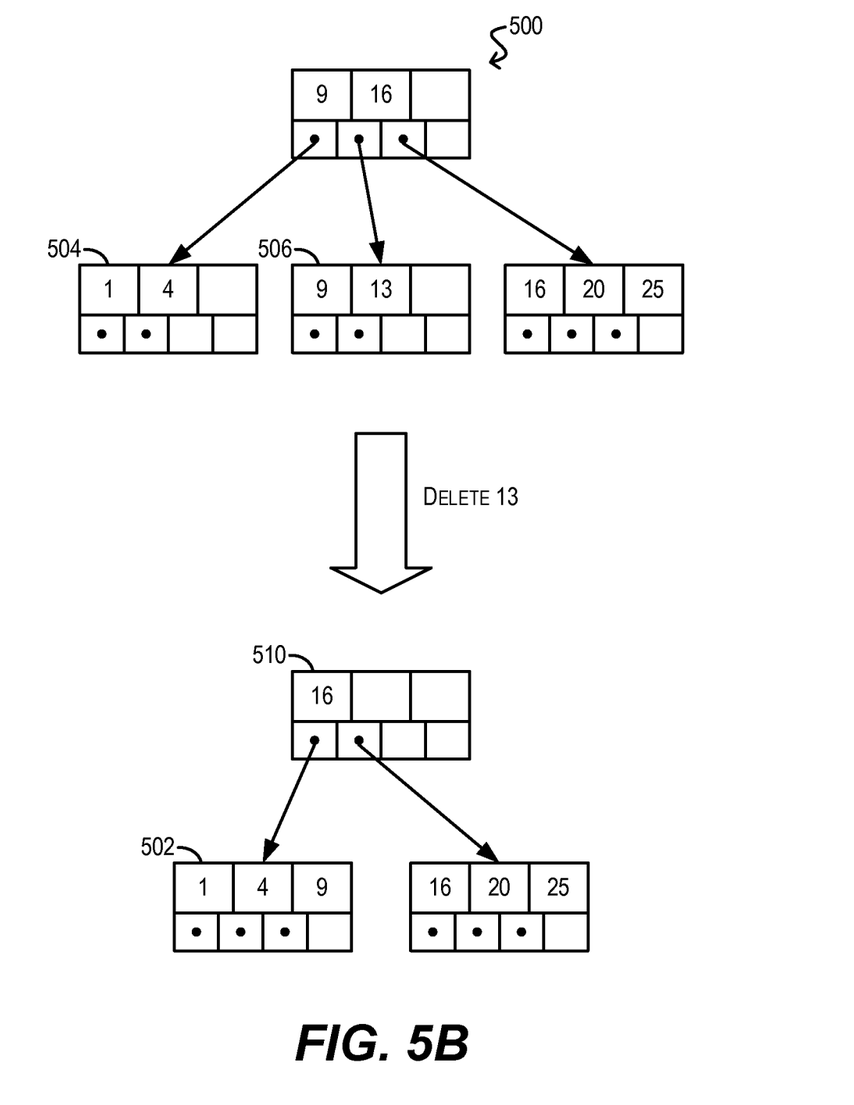

To better understand the operation of workflow 400, consider the example B+ tree 500 shown in FIGS. 5A and 5B. In FIG. 5A, key/data entry 13 is inserted into tree 500, resulting in the split of node 502 into two new nodes 504 and 506. In this scenario, if workflow 400 is applied to node 504 at the time of its instantiation, the key space for the node will be based on the corresponding key subinterval 0 to 8 in parent node 508. Accordingly, the keys allocated for node 504 will have a size that is sufficient to cover a range of 9 unique key values, which is 4 bits. In addition, the key values 1 and 4 in node 504 will be encoded using this key size (i.e., key value 1 will be encoded as bit string "0001" and key value 4 will be encoded at bit string "0100").

Similarly, if workflow 400 is applied to node 506 at the time of its instantiation, the key space for the node will be based on the corresponding key subinterval 9 to 15 in parent node 508. Accordingly, the keys allocated for node 506 will have a size that is sufficient to cover a range of 7 unique key values, which is 3 bits. In addition, the key values 9 and 13 in node 506 will be encoded using this key size (i.e., key value 9, which is effectively 0 in this subinterval, will be encoded as bit string "000," and key value 13, which is effectively 5 in this subinterval, will be encoded as bit string "101").

Turning now to FIG. 5B, this figure illustrates a delete operation whereby key/data entry 13 is removed from tree 500 after its insertion in FIG. 5A, resulting in the merging of nodes 504 and 506 back into node 502. In this scenario, the application of workflow 400 to merged node 502 will result in a key space for node 502 that is based on key subinterval 0 to 15 in parent node 510. Accordingly, the keys allocated for merged node 502 will have a size that is sufficient to cover a range of 16 unique key values, which is 4 bits. In addition, the key values 1, 4, and 9 in merged node 502 will be re-encoded using this new key size.

As mentioned previously, in certain embodiments the key space tuning technique described in Section 3 can be combined with the dynamic, per-node key allocation technique of workflow 400. For instance, with respect to tree 500 of FIGS. 5A and 5B, the key space tuning technique may be used to configure and allocate keys for the root node based on an expected key space received from an application. At the same time, the dynamic allocation technique of workflow 400 may be used to allocate keys for non-root nodes based on the key subintervals in their respective parents. Alternatively, these two techniques may be used separately and independently of each other.

Figure 6:
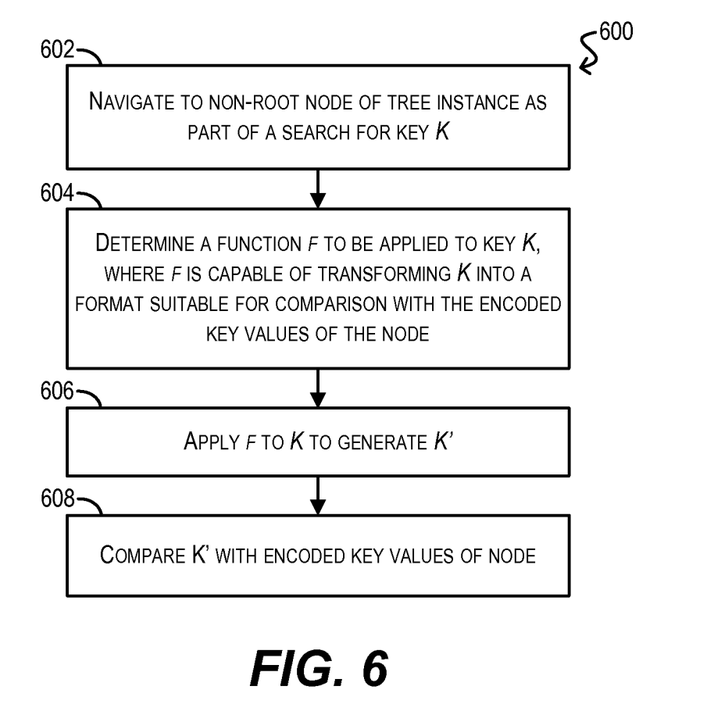
FIG. 6 depicts a workflow for searching the tree instance described in FIG. 4 according to an embodiment.

One consequence of the dynamic, per-node key allocation performed in workflow 400 is that the key values encoded at a given non-root node may not directly reflect the actual key values addressed by that node in the context of the overall key space of the tree instance. For example, as explained previously with respect to FIG. 5A, the key values at node 506 may be encoded within a range of 0 to 6, although these encoded values actually correspond to a range of 9-15 within the overall key space of tree 500. This means that, at time of searching the tree instance using a key K, tree implementation code 104 cannot directly compare K with the encoded key values at each non-root node in order to determine how to traverse down the tree. FIG. 6 depicts a workflow 600 that may be used by tree implementation code 104 as part of its search logic for addressing this issue according to an embodiment.

At block 602, tree implementation code 104 can navigate to a non-root node of a tree instance as part of a search for a key K in the tree. Upon arriving at the non-root node, tree implementation code 104 can determine a function $f$ to be applied to key K, where function $f$ is capable of transforming K into a format suitable for comparison with the encoded key values of the current node (block 604). In a particular embodiment, function $f$ can comprise masking certain bits in K that are not relevant to the key space covered by the encoded key values. In this embodiment, tree implementation code 104 can determine which bits to mask by referencing the corresponding key subinterval in the node's parent. For example, if K is 2048 and the key subinterval is 1024 to 3072, code 104 can determine that the first 10 bits of K (corresponding to values 0-1024) can be masked since these bits are not represented in the encoded key values of the node. Alternatively, tree implementation code 104 can determine which bits to mask by referencing metadata included in the node (e.g., a key offset value).

At block 606, tree implementation code 104 can apply function $f$ to key K to generate a modified key K'. Finally, at block 608, tree implementation code 104 can compare K' with the encoded key values of the node and proceed with its standard search logic. Note that tree implementation code 104 can repeat the steps of workflow 600 at each node that it visits during the search process until code 104 finds the desired key K and its corresponding data entry (or determines that K is not in the tree).

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for tuning a key space of an instance of a tree data structure, the method comprising:
    receiving, by a computer system from an application running on the computer system, an invocation of an application programming interface (API) for creating the instance of the tree data structure in a memory of the computer system, the invocation of the API including an expected key space value indicating an expected range of key values needed by the application in view of the application's expected use of the instance of the tree data structure; and
    in response to the invocation of the API:
        calculating, by the computer system, a number of bits to allocate to each key of each node of the instance based on the expected key space value; and
        instantiating, by the computer system, the instance of the tree data structure in the memory of the computer system, wherein the instantiating includes, at a time of instantiating each node of the instance, allocating a portion of the memory of the computer system to each key of the node, wherein the allocated memory portion has a size equaling the calculated number of bits.

2. The method of claim 1 wherein the expected key space value is less than a maximum possible key space supported or allowed by the application.

3. The method of claim 1 wherein calculating the number of bits to allocate to each key of each node comprises computing the logarithm in base 2 of the expected key space value.

4. The method of claim 1 wherein the tree data structure is a B+ tree.

5. The method of claim 1 further comprising:
receiving a request to extend the key space of the instance by an extension value;
creating a second instance of the tree data structure having a key space that covers a range of key values from zero to the extension value; and
chaining the second instance to the instance, such that tree operations associated with keys in a range between the expected key space value and the extension value are directed to the second instance.

6. The method of claim 5 further comprising:
receiving a request to reduce the key space of the instance back to the expected key space value; and
deleting the second instance of the tree data structure.

7. A non-transitory computer readable storage medium having stored thereon program code executable by a computer system, the program code embodying a method for tuning a key space of an instance of a tree data structure, the method comprising:
receiving, from an application running on the computer system, an invocation of an application programming interface (API) for creating the instance of the tree data structure in a memory of the computer system, the invocation of the API including an expected key space value indicating an expected range of key values needed by the application in view of the application's expected use of the instance of the tree data structure; and
in response to the invocation of the API:
calculating a number of bits to allocate to each key of each node of the instance based on the expected key space value; and
instantiating the instance of the tree data structure in the memory of the computer system, wherein the instantiating includes, at a time of instantiating each node of the instance, allocating a portion of the memory of the computer system to each key of the node, wherein the allocated memory portion has a size equaling the calculated number of bits.

8. The non-transitory computer readable storage medium of claim 7 wherein the expected key space value is less than a maximum possible key space supported or allowed by the application.

9. The non-transitory computer readable storage medium of claim 7 wherein calculating the number of bits to allocate to each key of each node comprises computing the logarithm in base 2 of the expected key space value.

10. The non-transitory computer readable storage medium of claim 7 wherein the tree data structure is a B+ tree.

11. The non-transitory computer readable storage medium of claim 7 wherein the method further comprises:
receiving a request to extend the key space of the instance by an extension value;
creating a second instance of the tree data structure having a key space that covers a range of key values from zero to the extension value; and
chaining the second instance to the instance, such that tree operations associated with keys in a range between the expected key space value and the extension value are directed to the second instance.

12. The non-transitory computer readable storage medium of claim 11 wherein the method further comprises:
receiving a request to reduce the key space of the instance back to the expected key space value; and
deleting the second instance of the tree data structure.

13. A computer system comprising:
a memory;
a processor; and
a non-transitory computer readable medium having stored thereon program code for tuning a key space of an instance of a tree data structure, the program code causing the processor to:
receive, from an application running on the computer system, an invocation of an application programming interface (API) for creating the instance of the tree data structure in the memory of the computer system, the invocation of the API including an expected key space value indicating an expected range of key values needed by the application in view of the application's expected use of the instance of the tree data structure; and
in response to the invocation of the API:
calculate a number of bits to allocate to each key of each node of the instance based on the expected key space value; and
instantiate the instance of the tree data structure in the memory of the computer system, wherein the instantiating includes, at a time of instantiating each node of the instance, allocating a portion of the memory of the computer system to each key of the node, wherein the allocated memory portion has a size equaling the calculated number of bits.

14. The computer system of claim 13 wherein the expected key space value is less than a maximum possible key space supported or allowed by the application.

15. The computer system of claim 13 wherein calculating the number of bits to allocate to each key of each node comprises computing the logarithm in base 2 of the expected key space value.

16. The computer system of claim 13 wherein the tree data structure is a B+ tree.

17. The computer system of claim 13 wherein the program code further causes the processor to:
receive a request to extend the key space of the instance by an extension value;
create a second instance of the tree data structure having a key space that covers a range of key values from zero to the extension value; and
chain the second instance to the instance, such that tree operations associated with keys in a range between the expected key space value and the extension value are directed to the second instance.

18. The computer system of claim 17 wherein the program code further causes the processor to:
receive a request to reduce the key space of the instance back to the expected key space value; and
delete the second instance of the tree data structure.

* * * * *